(12) United States Patent
Leung

(10) Patent No.: US 8,331,098 B2
(45) Date of Patent: Dec. 11, 2012

(54) MOBILE DEVICE WITH A FLIP-AROUND KEYBOARD

(75) Inventor: Kwok Ching Leung, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 242 days.

(21) Appl. No.: 12/818,689

(22) Filed: Jun. 18, 2010

(65) Prior Publication Data

US 2011/0310580 A1 Dec. 22, 2011

(51) Int. Cl.
 *H05K 5/00* (2006.01)
(52) U.S. Cl. .................... 361/755; 361/715
(58) Field of Classification Search .......... 361/600, 361/715, 755; 455/575.1–575.4, 575.7, 566, 455/73, 550.01, 572; 345/169, 156, 168, 345/173, 649, 659
See application file for complete search history.

(56) References Cited

U.S. PATENT DOCUMENTS

| | | | | |
|---|---|---|---|---|
| 4,517,660 | A * | 5/1985 | Fushimoto et al. | 361/679.15 |
| 4,885,430 | A * | 12/1989 | Kinser et al. | 361/749 |
| 6,519,812 | B2 * | 2/2003 | Ko et al. | 16/354 |
| 6,704,004 | B1 * | 3/2004 | O stergård et al. | 345/170 |
| 7,010,333 | B2 | 3/2006 | Trively | |
| 7,130,669 | B2 * | 10/2006 | Moon | 455/575.3 |
| 7,483,723 | B2 * | 1/2009 | Soderlund | 455/575.1 |
| 2003/0144023 | A1 | 7/2003 | Woods et al. | |
| 2005/0083308 | A1 | 4/2005 | Homer | |
| 2006/0001256 | A1 | 1/2006 | Morgan | |
| 2006/0012563 | A1 * | 1/2006 | Fyke et al. | 345/156 |
| 2006/0227102 | A1 | 10/2006 | Finke-Anlauff | |
| 2007/0014983 | A1 | 1/2007 | Slattery | |
| 2007/0060216 | A1 * | 3/2007 | Huang et al. | 455/575.3 |
| 2009/0149226 | A1 * | 6/2009 | Watanabe | 455/575.3 |

FOREIGN PATENT DOCUMENTS

WO 02/31807 A1 4/2002

OTHER PUBLICATIONS

EP 10166543.8 Search Report mailed Aug. 4, 2010.
http://www.chinavasion.com/product_info.php/pName/emerald-3-inch-touchscreen-dual-sim-world-phone-flip-key-pad/. Retrieved Nov. 2, 2011.
Sony Ericsson P910, http://www.gsmarena.com/sony_ericsson_p910-846.php.Retrieved Dec. 15, 2009.
http://www.gsmarena.com/sony_ericsson_p910-pictures-846.php. Retrieved Nov. 2, 2011.

* cited by examiner

*Primary Examiner* — Hung S Bui
(74) *Attorney, Agent, or Firm* — Fitch, Even, Tabin & Flannery, LLP

(57) ABSTRACT

A mobile device having a flip-around keyboard includes a housing, a display, and a keyboard rotatably coupled to the housing. The housing has a top end, a bottom end, a front surface, and a back surface. The display is located on the front surface of the housing. The keyboard is rotatably coupled at about the bottom end of the housing. The keyboard has a front face having a plurality of keys and a rear face opposite the front surface. In a first configuration, the rear face of the keyboard faces the display of the housing. In a second configuration, the front face of the keyboard faces the back surface of the housing. The keyboard can be rotatably coupled to the housing by a coupler that permits greater than two hundred seventy degrees of rotation about a lateral axis parallel to an edge of the housing.

20 Claims, 9 Drawing Sheets

MOBILE DEVICE WITH A FLIP-AROUND KEYBOARD

FIELD OF TECHNOLOGY

The present disclosure relates generally to mobile devices. More specifically, the present disclosure relates to mobile devices having a flip-around keyboard.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, mobile messaging devices, personal digital assistants, and handheld computers.

Whereas in the past, such mobile devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As the available functions of electronic devices continue to increase, the functionality of the UIs also needs to increase. Because electronic devices often have limited space for input devices and display screens, the size of the keyboard, the function buttons, the display and other components of the electronic device can be compromised to fit the switch panel on the electronic device. As might be expected, suppliers of such mobile electronic devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

BRIEF DESCRIPTION OF THE DRAWINGS

Embodiments of the present application will now be described, by way of example only, with reference to the attached Figures, wherein.

DETAILED DESCRIPTION

Figure 1:
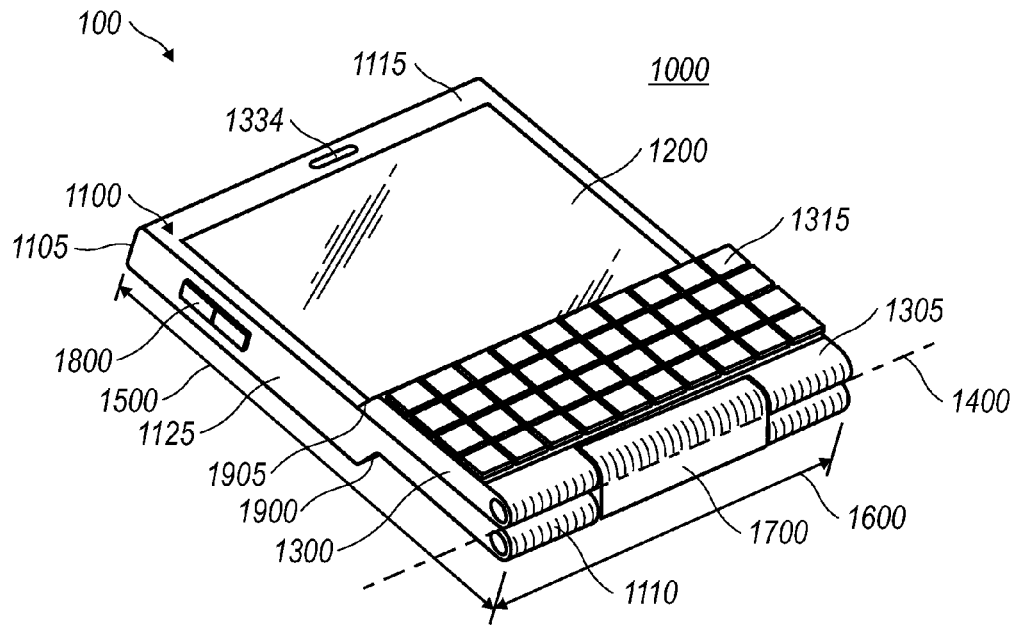
FIG. 1 is a front perspective view of an exemplary device having a flip-around keyboard in accordance with an exemplary embodiment in a first configuration.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this document will now be presented. The word "coupled" is defined as connected, whether directly or indirectly through intervening components and is not necessarily limited to physical connections. The term "mobile device" is defined as any electronic device that is capable of at least accepting information entries or commands from a user and includes its own power source. The term "flip-around" is defined as being rotatably coupled, rotatably connected, or otherwise coupled to a surface to permit rotation that is greater than or equal to one hundred eighty degrees and less than or equal to three-hundred sixty degrees about a lateral axis parallel to the surface. The term "translucent" refers to being transparent, see-through, semi-transparent, clear, non-opaque, or otherwise able to have light pass therethrough. The term "pressed" is interchangeable with the following terms and is defined as being depressed, compressed, pushed, contacted, touched, engaged, or otherwise actuated. Further definitions will be presented below.

The following figures describe a flip-around keyboard for a mobile device. While the following description describes a flip-around keyboard for a mobile communication device, one of ordinary skill in the art will appreciate that the flip-around keyboard can be implemented with a computer tablet, a handheld computing device, a netbook, a personal digital assistant (PDA), a handheld video gaming system, a messaging device, or any other handheld mobile that utilizes a switch panel, a keyboard, or a keypad.

A mobile device having a flip-around keyboard can include a housing, a display, and a keyboard. The housing can have a top end, a bottom end, a front surface having the display, and a back surface. The keyboard can be rotatably coupled to the housing at about the bottom end of the housing. The keyboard has a front face having a plurality of keys and a rear face opposite to the front face. The keyboard is coupled to the housing such that it is rotatable between a first configuration and a second configuration. In the first configuration, the rear face of the keyboard faces the display of the housing. In the second configuration, the front face of the keyboard faces the back surface of the housing. The assembly and configuration of the flip-around keyboard allow for a mobile device with a large display screen while maintaining the compact size of the mobile device. Additional components, such as navigation tools, function keys, a camera, keyboard locks, input devices, and the like can be implemented to enhance the functionality of the mobile device having a flip-around keyboard. Additionally, the mobile device having a flip-around keyboard can include keys having translucent indicia. Also, the mobile device having a flip-around keyboard can be configured to adjust the intensity of light emitted by the display based on the configuration of the device. In such an embodiment, the light intensity of the display can be adjusted to illuminate the keys of the keyboard when the device is in a first configuration, thereby making the keyboard visible for operation in low-light conditions.

Other configurations and arrangements will be described below in relation to illustrated embodiments. One of ordinary skill would appreciate that the elements from the illustrated embodiments can be optionally included and arranged in various combinations to achieve the described benefits of the presently disclosed mobile device having a flip-around keyboard.

FIG. 1 is a front perspective view of a mobile device 100 having an exemplary flip-around keyboard in a first configuration 1000. In at least one embodiment, the mobile device 100 has a housing 1100 having a top end 1105, a bottom end 1110, a front surface 1115, a back surface (not labeled), and side surfaces 1125. The mobile device 100 also has a length 1500 and a width 1600. As illustrated in FIG. 1, the mobile device 100 has a rectangular shape having a length 1500 that is the longer of the side surface 1125, the top end 1105, and the bottom ends 1110. The width 1600 is the shorter of the side surface 1125, the top end 1105, and the bottom ends 1110. In the illustrated embodiment, the length 1500 is the span of the side surface 1125, and the width 1600 is the span of the bottom ends 1110. While the illustrated embodiment shows a length 1500 and width 1600 that are different, one of ordinary skill in the art will appreciate that the length 1500 and width 1600 can be the same. For example, the mobile device 100 can have a square shape where the length 1500 and width 1600 are equal.

In FIG. 1, a display 1200 is disposed on the front surface 1115 of the mobile device 100. The display 1200 can be a lighted display screen, an LCD screen, a light emitting diode (LED) screen, an organic light emitting diode (OLED) screen, a touch-sensitive display, or any other type of display screen. A speaker 1334 or an audio port can be disposed on the front surface 1115 of the mobile device 100. In the illustrated embodiment, the speaker 1334 is located above the display 1200 and is proximate to the top end 1105 of the housing 1100. In at least the embodiment illustrated in FIG. 1, function keys 1800 can be disposed on the side surface 1125 of the mobile device 100. In the illustrated embodiment, the function keys 1800 are volume control keys. In other embodiments, the function key 1800 can include a power button, a mute button, a trackwheel, navigation keys, cursor keys, or the like can be disposed on the side surfaces 1125 of the mobile device 100. In yet other embodiments, the mobile device 100 can have a number of function keys 1800, which can include one or more of the above-described function keys.

In FIG. 1, a keyboard 1300 is rotatably coupled to the housing 1100 at about the bottom end 1110. In other alternative embodiments, the keyboard 1300 can be coupled to the housing 1100 at the side 1125 or at about the top end 1105. The keyboard 1300 has a front face 1305 having a plurality of keys 1315. The keys 1315 can be depressible keys of a push-button or push-pad nature, whereby data can be input to the device, when the keys are pressed. In at least one embodiment, the keys 1315 can each have at least one of alphabetic, numeric, symbolic, or function indicia, whereby the indicia indicate or signify the data that can be input to the device when the corresponding key is pressed. In another embodiment, the keys 1315 can have a combination of alphabetic, numeric, symbolic, or function indicia. In yet another embodiment, each key 1315 can have more than one alphabetic indicia, more than one function indicia, more than one symbolic indicia, more than one numeric indicia, or any combination thereof. The illustrated embodiment shows forty keys 1315 having twenty-six keys corresponding to alphabetic characters. However, one of ordinary skill in the art will appreciate that the keyboard 1300 can have fewer than or more than forty keys. For example, the keyboard 1300 can have twenty keys corresponding to a reduced keyboard layout, where more than one alphabetic character is associated with at least one key.

In the illustrated embodiment, the keyboard 1300 includes depressible keys 1315 that are wired to the housing 1100. For example, the wire connections can be encased in a hinge 1700. When the depressible keys 1315 are actuated, the keys 1315 can generate an input signal. The generated input signals then travel through the wires from the keyboard 1300 through the hinge 1700 and to the mobile device 100. While the illustrated keyboard 1300 shows active push-button or depressible keys 1315, the keyboard 1300 can include inactive dome switches and keycaps which do not generate signals to the mobile device 100, as will be described later in the disclosure. Additionally, while the illustrated keyboard 1300 shows push-button or depressible keys 1315, in alternative embodiments, the keys 1315 can be capacitive keys, touch-sensitive keys, or the like.

In FIG. 1, the keyboard 1300 is rotatably coupled to the housing 1100 by the hinge 1700, which permits rotation of greater than one hundred and eighty degrees of rotation about a lateral axis 1400 parallel to an edge of the housing 1100, for example, parallel to the bottom end 1110 of the housing 1100. The hinge 1700 can be a hollow structure to house the wiring and other connections that can electrically couple the keyboard 1300 to the mobile device 100 and display 1200. In other embodiments, the hinge 1700 can be a solid or flat piece. While the illustrated embodiment shows a double-pinned hinge 1700 that permits greater than two hundred seventy degrees of rotation, the keyboard 1300 can be coupled to the housing 1100 by other types of mechanisms, such as hinges, brackets, or couplers that each permits or when combined permit greater than one hundred and eighty degrees of rotation about an axis parallel to an edge of the housing 1100. For example, the hinge 1700 can permit greater than one-hundred and eighty degrees but less than three-hundred and sixty degrees of rotation greater than three-hundred degrees of rotation, greater than two-hundred degrees of rotation, or any other degree of rotation that permits the rear face (not shown) of the keyboard 1300 to face the display 1200 in a first configuration 1000 as illustrated in FIG. 1.

In the illustrated embodiment of FIG. 1, the double-pinned hinge 1700 includes a first pin of the hinge coupled to the housing 1100, and a second pin coupled to the keyboard 1300. The keyboard 1300 can rotate about the second pin independently of the rotation of the rotation of the hinge 1700 and keyboard 1300 relative to the housing 1100 via the first pin of the hinge 1700. The double-pinned hinge 1700 permits the keyboard 1300 to rotate greater than one-hundred and eighty degrees with respect to an axis 1400 parallel to an edge of the housing 1100. For example, the first pin coupled to the housing 1100 can permit the hinge 1700 and the keyboard 1300 to rotate one-hundred and eighty degrees with respect to the housing 1100. Additionally, the second pin coupled to the keyboard 1100 can provide the keyboard 1300 with greater than one-hundred and eighty degrees of rotation relative to the hinge 1700. In at least one embodiment, the hinge can be configured to include a stop which prevents the keyboard 1300 from rotating greater than a predetermined amount, for example one-hundred and eighty degrees, but allow the keyboard 1300 to rotate greater than one-hundred and eighty degrees relative to the housing 1100.

In FIG. 1, the first configuration 1000 of the mobile device 100 is illustrated where the rear face (not shown) of the keyboard 1300 faces the display 1200 of the housing 1100. In the first configuration 1000, the keyboard 1300 is exposed and a portion of the display 1200 is covered or concealed by the keyboard 1300. In the first configuration 1000, the keys 1315 of the keyboard 1300 are exposed so that a user can input data such as alphanumeric data, text, numerals, function commands, or the like. For example, in the first configuration 1000, the mobile device 100 can be operable for composing emails, composing text messages, chatting on an instant messaging application, or the like. Additionally, in the first configuration 1000, the mobile device 100 can be operable in a portrait configuration.

Figure 2:
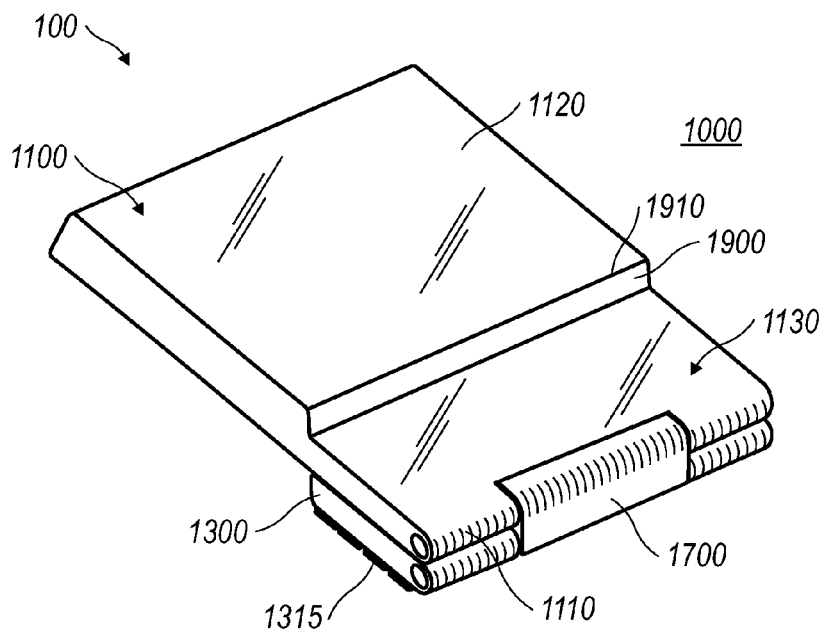
FIG. 2 is a back perspective view of the exemplary device having the flip-around keyboard illustrated in FIG. 1 in the first configuration.

FIG. 2 illustrates a back perspective view of the exemplary device 100 in the first configuration 1000. The back surface 1120 of the housing 1100 is shown in FIG. 2 and can include a keyboard receiving portion 1130. The keyboard receiving portion 1130 is shaped and configured to receive the keyboard 1300 when the mobile device 100 is in the second configuration. In at least one embodiment, the keyboard receiving portion 1130 includes an engagement surface 1900 that is shaped to matingly engage an edge surface 1905 (FIG. 1) of the keyboard 1300. In the embodiment illustrated in FIGS. 1 and 2, the edge surface 1905 of the keyboard 1300 inclines toward the display 1200 in the first configuration 1000. The engagement surface 1900 of the keyboard receiving portion 1130 is also inclined to correspond to the incline of the edge surface 1905 of the keyboard 1300. The back surface 1120 of the device also includes a ridge 1910 where the incline of the engagement surface 1900 terminates. When the keyboard 1300 is rotated towards the back surface 1120 of the mobile device 100 and received in the keyboard receiving portion 1130, the edge surface 1905 of the keyboard 1300 matingly engages the engagement surface 1900 of the keyboard receiving portion 1130.

Figure 3:
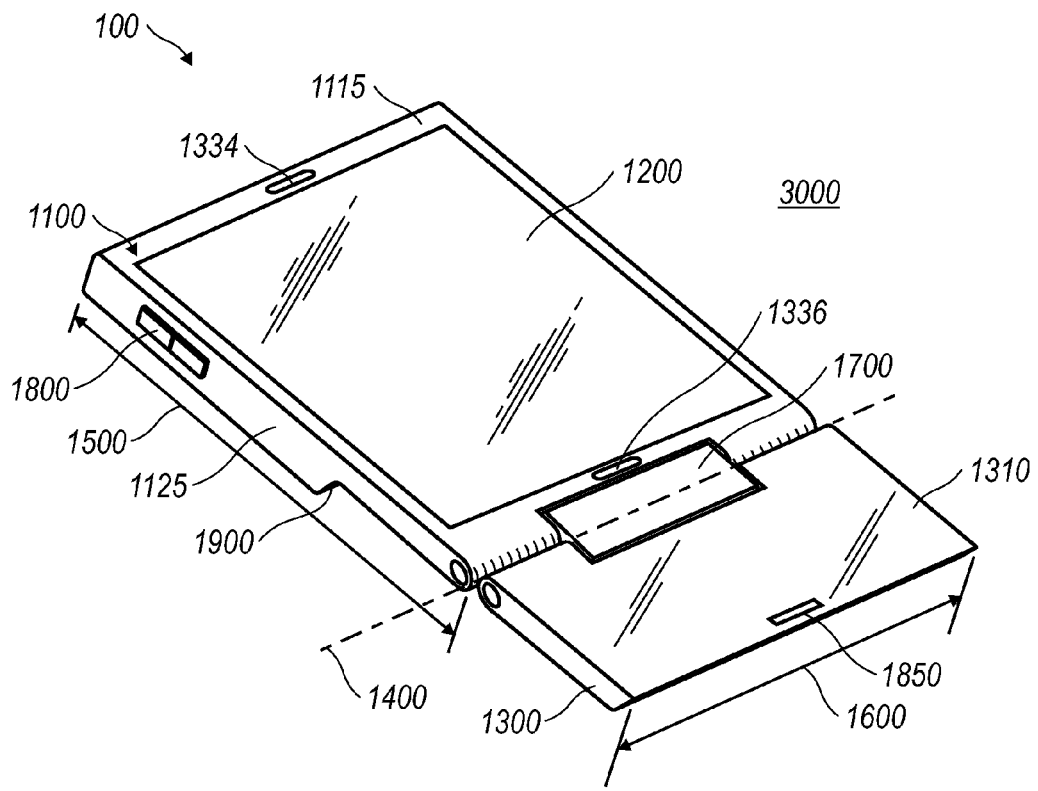
FIG. 3 is a front perspective view of the exemplary device having the flip-around keyboard illustrated in FIG. 1 in a transition configuration.

FIG. 3 shows a front perspective view of the exemplary device 100 illustrated in FIG. 1 in a transition configuration 3000. Comparing FIG. 1 to FIG. 3, the keyboard 1300 has been lifted off of the display 1200 and rotated towards the back surface 1120 of the mobile device 100. Specifically, the keyboard 1300 has been rotated one-hundred and eighty degrees about the axis 1400 parallel to the bottom end 1110 of the housing 1100. In the illustrated embodiment, the keyboard 1300 has been rotated such that keyboard 1300 lies in the same plane as the display 1200. A rear face 1310 of the keyboard 1300 is shown. In the transition configuration 3000, the display 1200 is fully exposed. A microphone 1336 located below the display 1200 and proximate to the bottom end 1110 of the housing 1100 is also exposed in the transition configuration. In at least one embodiment, the keyboard 1300 can include a locking mechanism 1850 on the rear face 1310. The locking mechanism 1850 can be a latching mechanism, where the edge surface 1905 of the keyboard 1300 includes a locking portion that snaps in place with a corresponding catch portion (not shown) on the engagement surface 1900 of the keyboard receiving portion 1130 (shown in FIG. 2).

Figure 4:
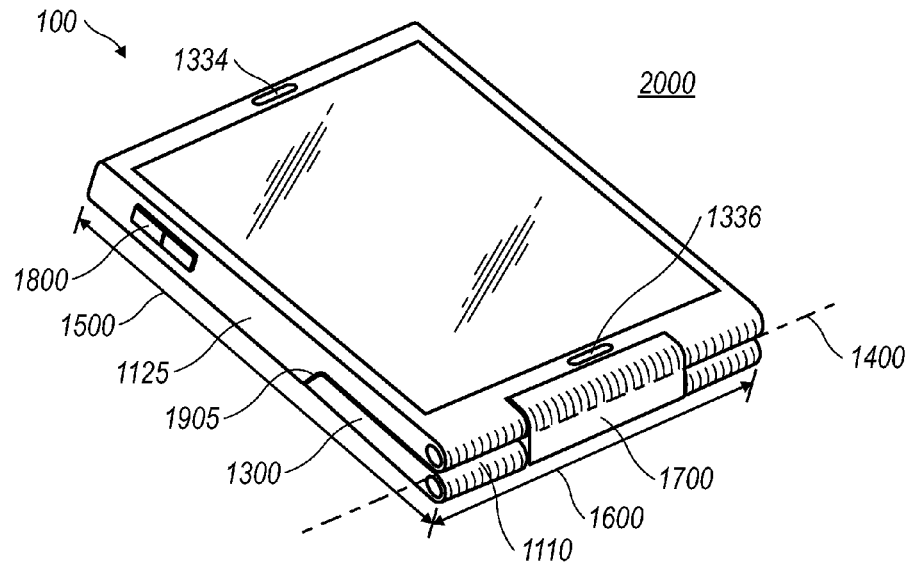
FIG. 4 is a front perspective view of the exemplary device having the flip-around keyboard illustrated in FIG. 1 in a second configuration.

While the keyboard 1300 has been rotated one-hundred and eighty degrees about the axis 1400 parallel to the bottom end 1110 of the housing in the transition configuration 3000 illustrated in FIG. 3, one of ordinary skill in the art will appreciate that the transition configuration 3000 can include any configuration where the keyboard 1300 is in rotation between the first configuration 1000 and the second configuration (shown in FIG. 4). For example, the transition configuration 3000 can include configurations where the keyboard 1300 is being rotated ninety degrees, one-hundred and forty-five degrees, two hundred degrees, two-hundred and seventy degrees, or any degree between zero and three-hundred sixty degrees, exclusive, about the axis parallel to the bottom end 1110 of the housing 1100.

FIG. 4 is a front perspective view of the exemplary device 100 illustrated in FIG. 1 in a second configuration 2000. In the second configuration 2000, the keyboard 1300 has been rotated more than two hundred seventy degrees about the lateral axis 1400 parallel to the bottom end 1100 of the mobile device 100. The double-pinned hinge 1700 allows for the rotation of the keyboard 1300. The keyboard 1300 has also been rotated to matingly engage with the keyboard receiving portion 1130 of the back surface of the housing 1100. As illustrated, the front surface (not shown) of the keyboard 1300 faces the back surface (not shown) of the housing 1100. In the second configuration 2000, the display 1200 is fully or completely exposed, and the keys 1315 on the front face 1305 of the keyboard 1300 are hidden or concealed. As shown in FIG. 4, the display 1200, which can be a touch-sensitive display, is unobstructed thereby permitting a user to view objects or items displayed on the display 1200 in a larger, full, or widescreen mode and also permitting the user to input data using a touch-sensitive display 1200, where provided. For example, in the second configuration 2000, the mobile device 100 can be operable for browsing the internet, watching videos, listening to music, playing a video game, viewing a calendar, or using other applications or programs. In the second configuration 2000, the mobile device 100 can be used in either a portrait or a landscape orientation. Additionally, in the second configuration, the mobile device 100 can be operated to make telephone calls or transmit voice communications. Comparing the first configuration 1000 (FIGS. 1 and 2) and the second configuration 2000 (FIGS. 4 and 5), the width 1600 and the length 1500 of the mobile device 100 are the same in the first configuration 1000 and the second configuration 2000.

Figure 5:
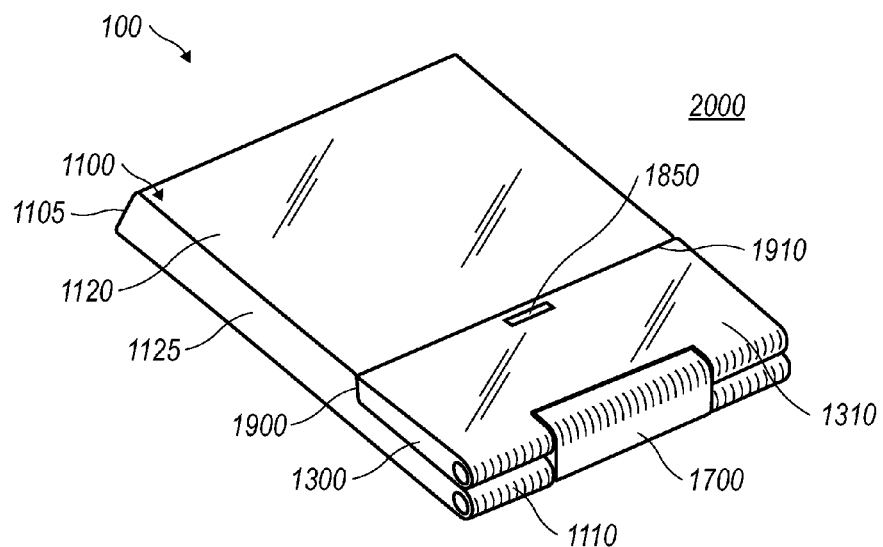
FIG. 5 is a back perspective view of the exemplary device having the flip-around keyboard illustrated in FIG. 1 in the second configuration.

FIG. 5 is a perspective view of the back of the exemplary device 100 in the second configuration 2000. As illustrated, the keyboard 1300 has been rotated and received by the keyboard receiving portion 1130. As discussed above, the keyboard receiving portion 1130 is shaped and configured to receive the keyboard 1300. The engagement surface 1900 of the keyboard matingly engages the edge surface 1905 of the keyboard 1300. In the second configuration 2000, the edge surface 1905 of the keyboard 1300 aligns with the ridge 1910 of the keyboard receiving portion 1130, so that the back surface 1120 of the housing 1100 is contiguous with the rear face 1310 of the keyboard 1300. In at least one embodiment, the back surface 1120 of the housing 1100 is flush with the rear face 1310 of the keyboard 1300 in the second configuration 2000. FIG. 5 also illustrates the locking mechanism 1850 on the rear face 1310 of the keyboard 1300. The locking mechanism 1850 can be configured to secure or temporarily lock the keyboard 1300 in the keyboard receiving portion 1130 of the housing 1100 when the mobile device 100 is operated in the second configuration 2000. For example, the locking mechanism 1850 can be a latching mechanism (as discussed above), a magnetic lock, a cam lock, a lock and key mechanism, a spring lock, or any other mechanism that will hold the keyboard 1300 to the housing 1100 when the mobile device 100 is operated in the second configuration 2000.

Figure 6:
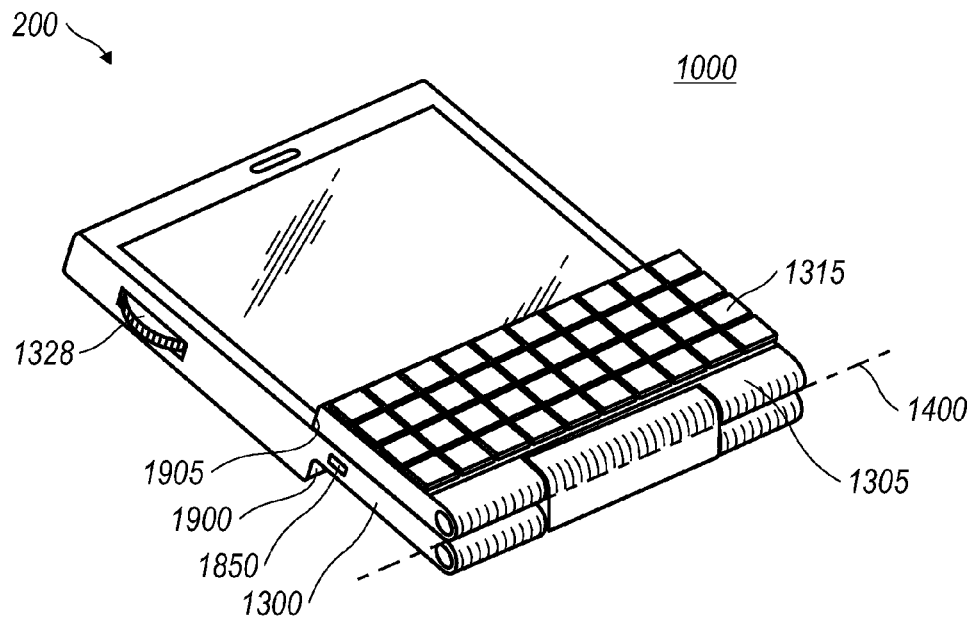
FIG. 6 is a front perspective view of an exemplary device having a flip-around keyboard in accordance with an alternative exemplary embodiment in a first configuration.
Figure 7:
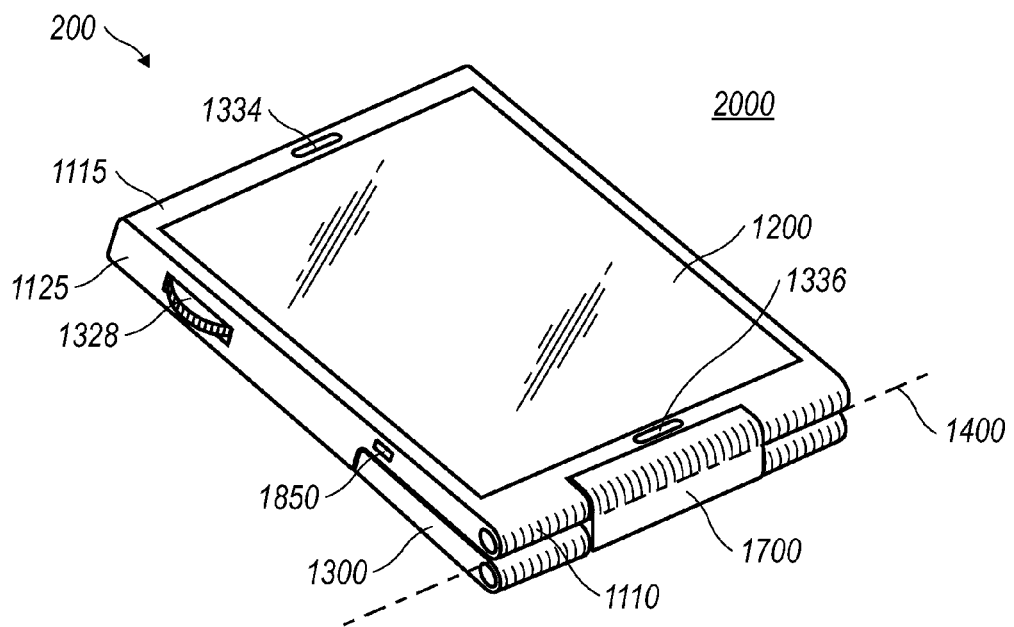
FIG. 7 is a front perspective view of the exemplary device having the exemplary flip-around keyboard illustrated in FIG. 6 in a second configuration.

FIGS. 6 and 7 are perspective views of an exemplary device 200 having a flip-around keyboard 1300 in accordance with an alternative exemplary embodiment in a first configuration 1000. The exemplary device 200 illustrated in FIGS. 6 and 7 is similar to the device 100 illustrated in FIGS. 1-5, except that the device 200 includes a navigation tool 1328 that is located on the side surface 1125 of the housing 1100. While the illustrated embodiment shows a navigation tool that is a trackwheel 1328, the navigation tool can also be directional buttons, an optical trackpad, a touchpad, a rocker navigation tool, an omnidirectional joystick, or the like. Additionally, the side surface 1125 can also include a locking mechanism 1850 proximate the bottom end 1110 of the housing 1100. In the illustrated embodiment, the locking mechanism 1850 is also located proximate to and below the keyboard 1300 in the first configuration.

The device 200 illustrated in FIGS. 6 and 7 also differs from the device 100 illustrated in FIGS. 1-5 in that the keyboard 1300 includes an edge surface 1905 that is a straight or square edge surface. The back surface (not shown) of the housing 1100 can include a keyboard receiving portion (not labeled). The keyboard receiving portion is shaped and configured to receive the keyboard 1300 when the mobile device 200 is in a second configuration 2000. The keyboard receiving portion includes an engagement surface 1900 that is shaped to matingly engage the edge surface 1905 of the keyboard 1300. In the embodiment illustrated in FIGS. 6 and 7, the engagement surface 1900 of the keyboard receiving portion of the back surface 1120 of the mobile device 100 is also a straight or square edge surface to correspond to the straight or square edge 1905 of the keyboard 1300. The back surface 1120 of the device also includes a ridge 1910 where the engagement surface 1900 can terminate. When the keyboard 1300 is rotated towards the back surface 1120 of the mobile device 200 and received in the receiving portion, the edge surface 1905 of the keyboard 1300 matingly engages the engagement surface 1900 of the keyboard receiving portion.

While the illustrated embodiments in FIGS. 1-7 show a mobile device 100, 200 that is a mobile communication device, the mobile device can also be a PDA, a short-range radio transmitter/receiver, a GPS device, a handheld electronic translator, a GPS device, a messaging device, a handheld gaming device, or any other electronic device that includes a keyboard, keypad, or switch panel.

The various types of keyboards 1300 that can be implemented with the mobile device having a flip-around keyboard illustrated herein and the operation thereof will now be described. Returning to FIG. 1, in the illustrated embodiment, the keyboard 1300 includes depressible keys 1315 that are wired to the housing 1100. For example, the wire connections can be encased in the hinge 1700. When the depressible keys 1315 are actuated, the keys 1315 can generate an input signal. The generated input signals then travel from the keyboard 1300 through the wires in the hinge 1700 to the mobile device 100. While the illustrated keyboard 1300 shows active push-button or depressible keys 1315, the keyboard 1300 can include inactive dome switches and keycaps which do not generate signals to the mobile device 100. For example, when the inactive keys 1315 are depressed to close a corresponding dome switch, the dome switch closure does not necessarily generate a signal to the processor of the device but rather provides tactile feedback to the user. The keyboard 1300 can include a detection system that can measure the proximity of the keyboard 1300 to the display 1200. When a key 1315 is depressed and closes a dome switch, the display 1200 can sense the change in distance between the open dome switch and the closed dome switch, thereby determining that a key 1315 has been depressed to enter input into the device 100. Additionally, in such an embodiment, the hinge 1700 can be a flat or solid piece since the keyboard 1300 is not directly wired to the mobile device 100.

Figure 8:
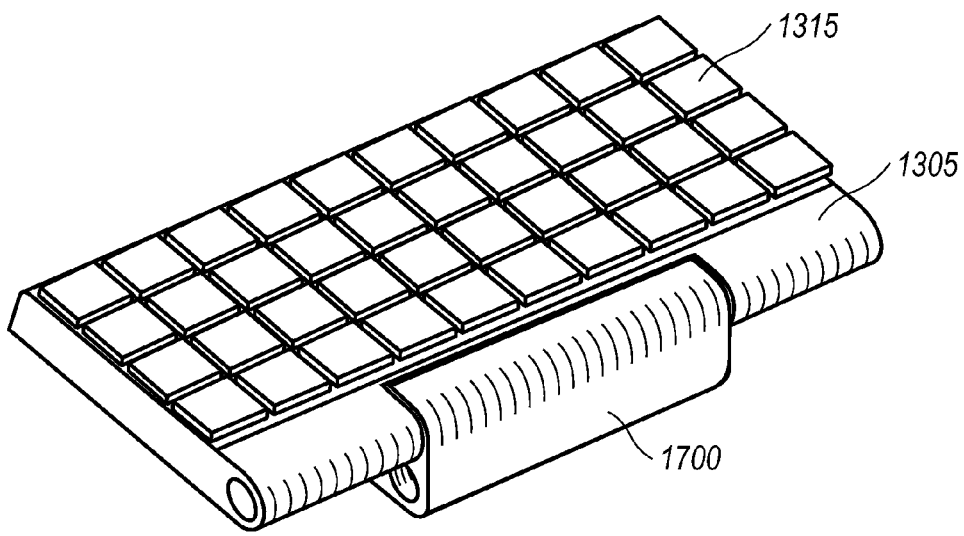
FIG. 8 is a perspective view of a front face of an exemplary keyboard for a mobile device having a flip-around keyboard.
Figure 9:
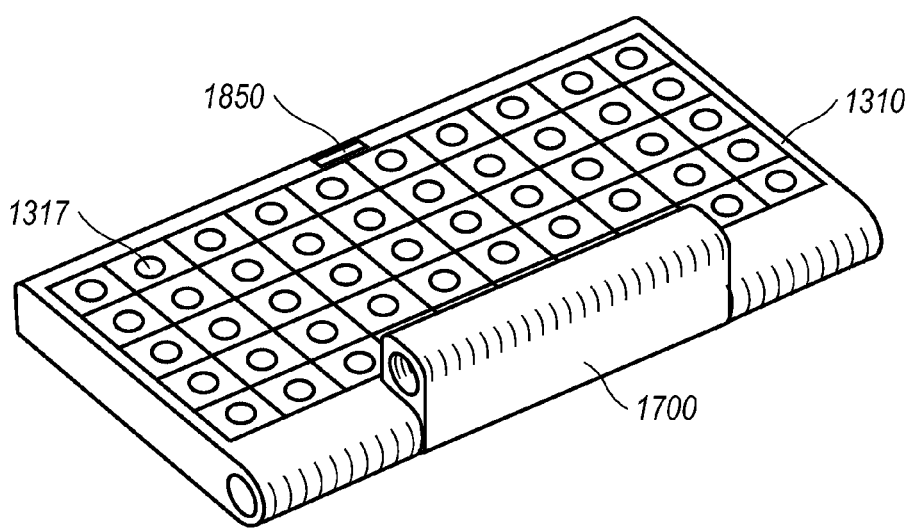
FIG. 9 is a perspective view of a rear face of the exemplary keyboard illustrated in FIG. 8 for a mobile device having a flip-around keyboard.

In at least one alternative embodiment, as shown in FIGS. 8 and 9, the keyboard 1300 can have non-wired push-button or depressible keys 1315 that include a stem 1317 (shown in FIG. 9). When the device is in the first configuration 1000 with the rear face 1310 of the keyboard 1300 facing the display 1200, the stem 1317 of the actuated key 1315 comes in contact with the display 1200 each time the key 1315 is actuated. For example, when a depressible key 1315 is actuated pushed, depressed, or compressed, the corresponding stem 1317 protrudes from the rear face 1310 of the keyboard 1300 and contacts the display 1200. In at least one example, if the display 1200 is a touch-sensitive display, when the stem 1317 contacts the display 1200 the stem 1317 can input data such as text, numerals, or other inputs to the mobile device via the touch sensitive display 1200. In such an embodiment, input data can be generated from the touch sensitive display 1200 instead of from the keyboard 1300, and the keyboard 1300 provides the user with tactile feedback that is familiar to conventional keyboards. The tactile feedback informs the user that a key of the keyboard has been successfully actuated to enter input into the associated mobile device. While the illustrated embodiment of FIG. 9 shows an exposed bottom surface 1310 of the keyboard, one of ordinary skill in the art will appreciate that the bottom surface 1310 can be covered with a plastic plate, a rubber film, or the like that will still permit the stem 1317 of the depressed key 1315 to contact the display 1200.

In another embodiment, the keyboard 1300 can be an induction keyboard. In this embodiment, the keyboard 1300 can have a plurality of keys 1315 disposed on the front face 1305 of the keyboard 1300, as shown in FIG. 8. The keys 1315 of the induction keyboard 1300 can each have a stem 1317 (shown in FIG. 9) having a magnet (not shown) at the tip of the stem 1317. When the device is in the first configuration 1000 with the rear face 1310 of the keyboard 1300 facing the display 1200, the display 1200 can be configured to measure a change in distance between the display 1200 and a key 1315 of the keyboard 1300. For example, the display 1200 can also include a magnet (not shown). When a key 1315 of the induction keyboard 1300 is actuated the stem 1315 moves a distance closer to the display 1200. This change in distance moves the magnet at the tip of the stem 1317 closer to the magnet in the display 1200 which thereby creates or induces an electric charge signifying data input from the depressed or actuated key. The electric charge sends or transmits a signal to a processor housed within the device that processes the signal into data such as text, numerals, functions, or any other type of commands or inputs. With an induction keyboard 1300, the bottom surface 1310 need not be exposed, as illustrated in FIG. 9. Instead, the bottom surface 1310 can be covered with a plastic plate, a rubber film, or the like that will still permit the induction of an electric charge between the depressed key 1315 and the display 1200.

Figure 10:
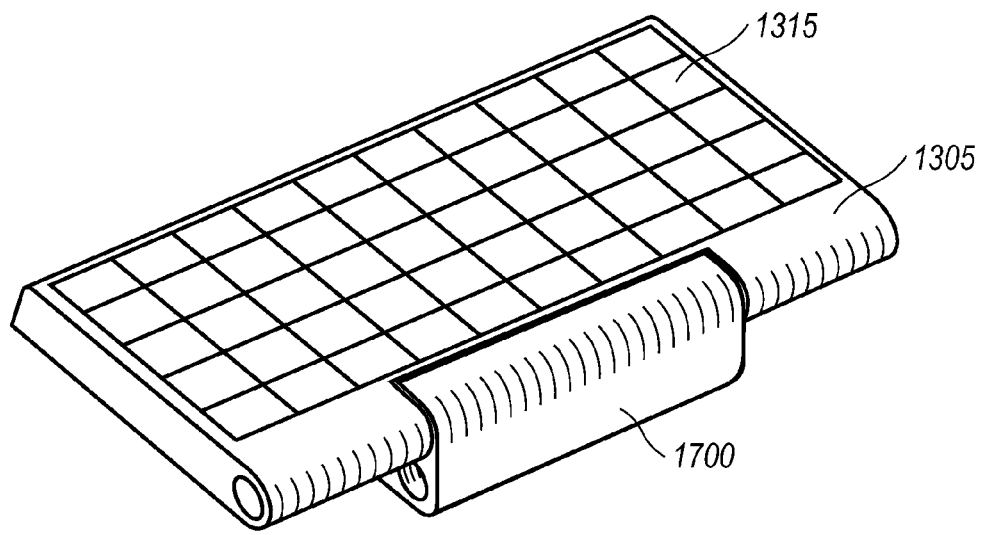
FIG. 10 is a perspective view of a front face of an exemplary keyboard for a mobile device having a flip-around keyboard in accordance with an alternative embodiment.
Figure 11:
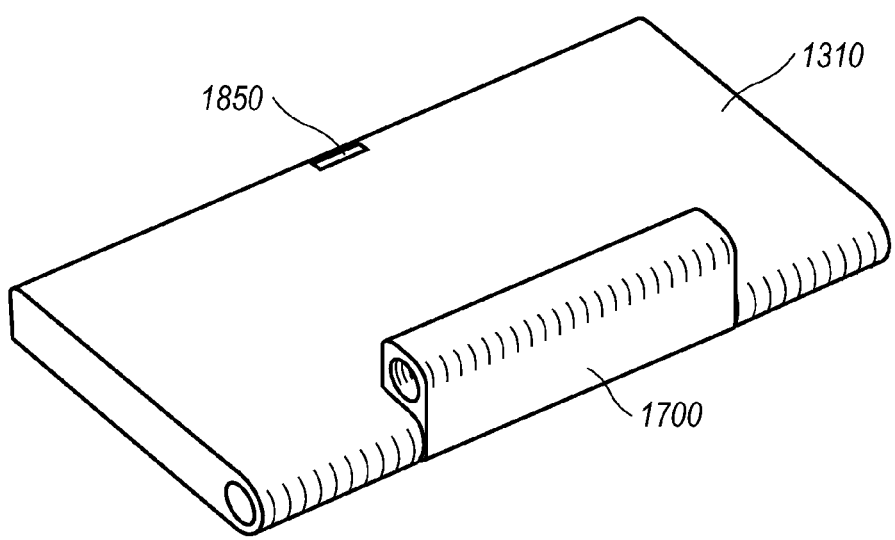
FIG. 11 is a perspective view of a rear face of the exemplary keyboard illustrated in FIG. 10 for a mobile device having a flip-around keyboard in accordance with an exemplary embodiment.

FIGS. 10 and 11 show another alternative embodiment of a flip-around keyboard 1300 that can be implemented in a mobile device. In FIGS. 10 and 11, the keyboard 1300 is a capacitive keyboard. When the device is in the first configuration 1000, the keys 1315 of the keyboard 1300 are exposed. As shown in FIG. 10, the keys 1315 are not chiclet type keys, as typically found in conventional push-button keyboards. Instead, the capacitive keyboard 1300 includes substantially flat keys 1315. When a key 1315 of the capacitive keyboard 1300 is depressed, the capacitance of the key 1315 changes. This change in capacitance transmits a signal to a processor housed in the housing 1100 that indicates that data has been entered at the keyboard 1300 to the device. The processor then translates the signal into data entry, text entry, numeric entry, command entry, or any other type of input. As the capacitive keyboard 1300 does not need to contact or interact with the display 1200 in order to enter input to the device, the rear face 1310 of the keyboard 1300 can be flat and covered, as shown in FIG. 11.

Figure 12:
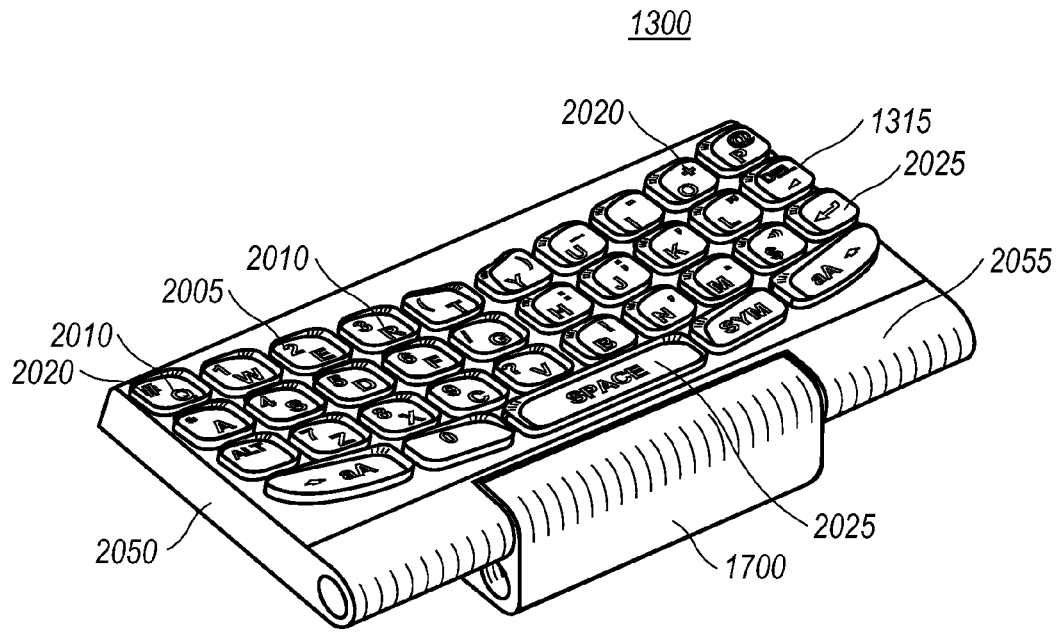
FIG. 12 is a perspective view of a front face of an exemplary keyboard for a mobile device having a flip-around keyboard with translucent indicia.

FIG. 12 is an exemplary embodiment of a flip-around keyboard 1300 in accordance with the present disclosure. The flip-around keyboard 1300 illustrated in FIG. 12 is similar to the keyboards illustrated in FIGS. 8-11, except that the keyboard 1300 illustrated in FIG. 12 further includes keyboard keys 1315 with translucent indicia. The indicia signify or indicate the available data that can be input by the corresponding key 1315 upon actuation of the key 1315. In the embodiment illustrated in FIG. 12, the keyboard keys 1315 have at least one of a numeric 2005, alphabetic 2010, symbolic 2020, or function 2025 indicia. The symbolic indicia 2020 can be symbols that represent characters that are not alphabetic or numeric, such as punctuation symbols, an asterisk, an ampersand, or the like. A function 2025 indicia can include an indicator that informs a user of a function that is associated with that particular keyboard key 1315. For example, function 2025 indicia can include a "return" symbol, phrases such as "SPACE," a "shift" symbol, or any other representation of a function. In FIG. 12, the alphabetic indicia 2010 on the keyboard keys 1315 are arranged in a QWERTY-style layout 1315. However, one of ordinary skill in the art will appreciate that other keyboard layouts 1315, such as a QWERTZ, AZERTY, Dvorak, reduced-QWERTY, a language-specific layout, or any other standard or reduced keyboard layout, can be implemented. Additionally, as illustrated in FIG. 12, at least one keyboard key 1315 includes more than one indicia. Also in FIG. 12, at least one keyboard key 1315 includes a combination of two different types of indicia. For example, FIG. 12 illustrates a keyboard key 1315 that includes an alphabetic indicia 2010 "Q" and a symbolic indicia 2020 "#".

In FIG. 12, the alphabetic, numeric, symbolic, and function indicia are translucent, whereby light can pass through the indicia to illuminate the indicia. Further details of the translucent indicia will be described in relation to FIG. 13.

The keyboard keys 1315 illustrated in FIG. 12 are depressible keys; however, it is contemplated that the keys 1315 can be touch-sensitive keys, capacitive keys, or the like, so long as the keys 1315 can be formed to include translucent indicia 2005, 2010, 2020, 2025. Additionally, in FIG. 12, the side surface 2050 and the front surface 2055 of the keyboard 1300 can be formed of an opaque material, such as plastic or rubber. As the front surface 2055 and the side surface 2050 are opaque, light that passes through the keyboard 1300 can illuminate the indicia 2005, 2010, 2020, 2025 of the keyboard keys 1315 at a stronger intensity since the light will not pass through the opaque surfaces of the keyboard 1300. In one embodiment, at least a portion of the rear face (not shown) of the keyboard 1300 can be formed from translucent material, thereby allowing light to pass through the rear face of the keyboard 1300 and illuminate the translucent indicia 2005, 2010, 2020, 2025 of the keyboard keys 1315. In an alternative embodiment, the entire rear face of the keyboard 1300 can be formed from translucent material. In another embodiment, the rear face of the keyboard 1300 can be removed thereby forming a hollow space beneath the keys 1315 of the keyboard 1300 and between the side surfaces 2050 and the front surface 2055 of the keyboard 1300, thereby allowing light to pass through the keyboard to illuminate the translucent indicia 2005, 2010, 2020, 2025 of the keyboard keys 1315.

Figure 13:
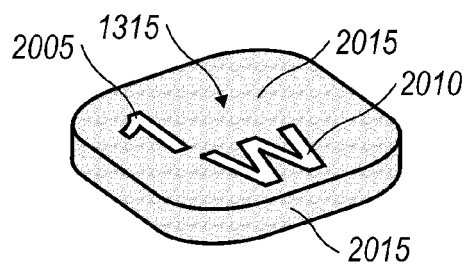
FIG. 13 is a perspective view of one of the keys of the flip-around keyboard illustrated in FIG. 12.

FIG. 13 is a close-up view of one of the keyboard keys 1315 depicted in FIG. 12. The keyboard key 1315 illustrated in FIG. 13 includes numeric indicia 2005 and alphabetic indicia 2010. As illustrated, the numeric indicia 2005 and the alphabetic indicia 2010 are formed from a translucent material and the remaining keyboard key surfaces 2015 are formed from an opaque material. For example, the indicia 2005, 2010 can be molded from a translucent plastic or a translucent rubber. The indicia 2005, 2010 can then be embedded or affixed in an opaque rubber or an opaque plastic that forms the remaining surfaces 2015 of the keyboard key 1315. In an alternative embodiment, the remaining keyboard key surfaces 2015 can be formed from a translucent material that is less translucent than the material used to form the indicia 2005, 2010. Additionally, in one embodiment, the indicia 2005, 2010 can be made from a clear translucent material or from a colored material that is suitably translucent to allow light to pass therethrough and illuminate the indicia 2005, 2010. In another embodiment, the indicia 2005, 2010 can be formed from a frosted translucent material, thereby providing a muted lighting effect, a soft lighting effect, or a frosted effect. The assembly of a keyboard 1300 having translucent indicia 2005, 2010, 2020 with a mobile device configured in the first configuration will be described in relation to FIG. 14.

Figure 14:
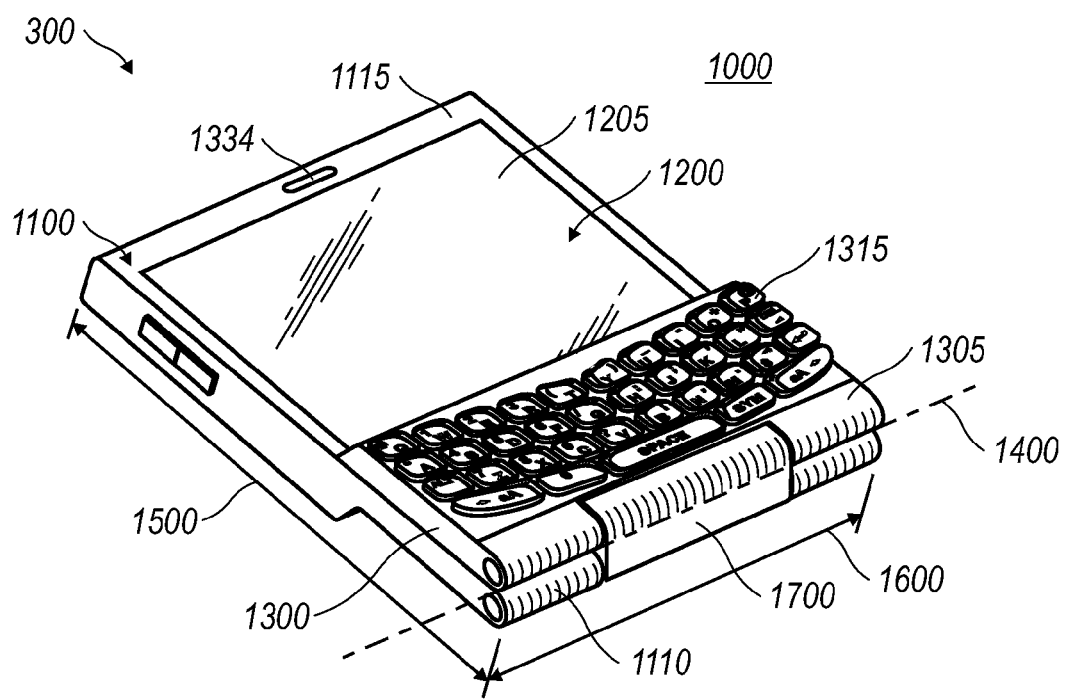
FIG. 14 is a front perspective view of an exemplary device having a flip-around keyboard having translucent indicia in accordance with an exemplary embodiment in a first configuration.

FIG. 14 is an illustration of the mobile device 100 having the exemplary flip-around keyboard with translucent indicia, where the mobile device 100 is configured in the first configuration 1000. In the illustrated configuration, the rear face (not shown) of the keyboard 1300 faces the display 1200 of the housing. The rear face of the keyboard 1315 is formed of a translucent material to allow light emitted from the display 1200 to pass through the keyboard 1300 to illuminate the translucent indicia of the keyboard keys 1315. By illuminating the indicia of the keyboard keys 1315, a user can identify the indicia associated with keyboard keys 1315 and enter numeric, alphabetic, or function input in low-light conditions, such as in a dark room, a movie theatre, when passing through a tunnel, or any other low-light condition.

In an alternative embodiment, the mobile device 100 illustrated in FIG. 14 can be configured such that the mobile device 100 adjusts the intensity of the light emitted from the display 1200 when the keyboard 1300 is in the first configuration. For example, the mobile device 100 can be configured to detect that the keyboard 1300 has been rotated into the first configuration and that the rear face of the keyboard 1300 is facing the display 1200. In response to this detection, a processing module (not shown) of the mobile device 100 can adjust the intensity of light emitted by the display 1200 thereby ensuring the translucent indicia of the keyboard 1300 are illuminated. In at least one embodiment, the mobile device 100 can include a processing module that adjusts the intensity of the light emitted by the display 1200. For example, the processing module can be communicatively coupled to the display 1200 and the keyboard 1300, and can be programmed to detect the configuration of the keyboard 1300 and adjust the light intensity of the display 1200. In one embodiment, the processing module can be programmed to adjust the intensity of light emitted by the display 1200 such that the light intensity is greater in the first configuration 1000 than the light intensity in the second configuration 2000. As a result, light, energy, and power can be efficiently utilized.

In another embodiment, when the processing module detects that the mobile device 100 is configured in the first configuration 1000, the processing module can adjust the intensity of light emitted by the display 1200 such that the portion of the display beneath or covered by the keyboard 1300 emits a stronger intensity of light than the remaining unobstructed portion 1205 of the display 1200 that is exposed or unobstructed by the keyboard 1300. In such an embodiment, rather than increasing the light intensity of the entire display 1200 when the mobile device 100 is in the first configuration 1000, only a portion of the display 1200 has an increased light intensity. Thus, there is an increase in the mobile device's 100 power, light, and energy efficiency as only the necessary portions of the display required to illuminate the translucent indicia of the keyboard 1300 are adjusted to emit stronger light intensity.

Figure 15:
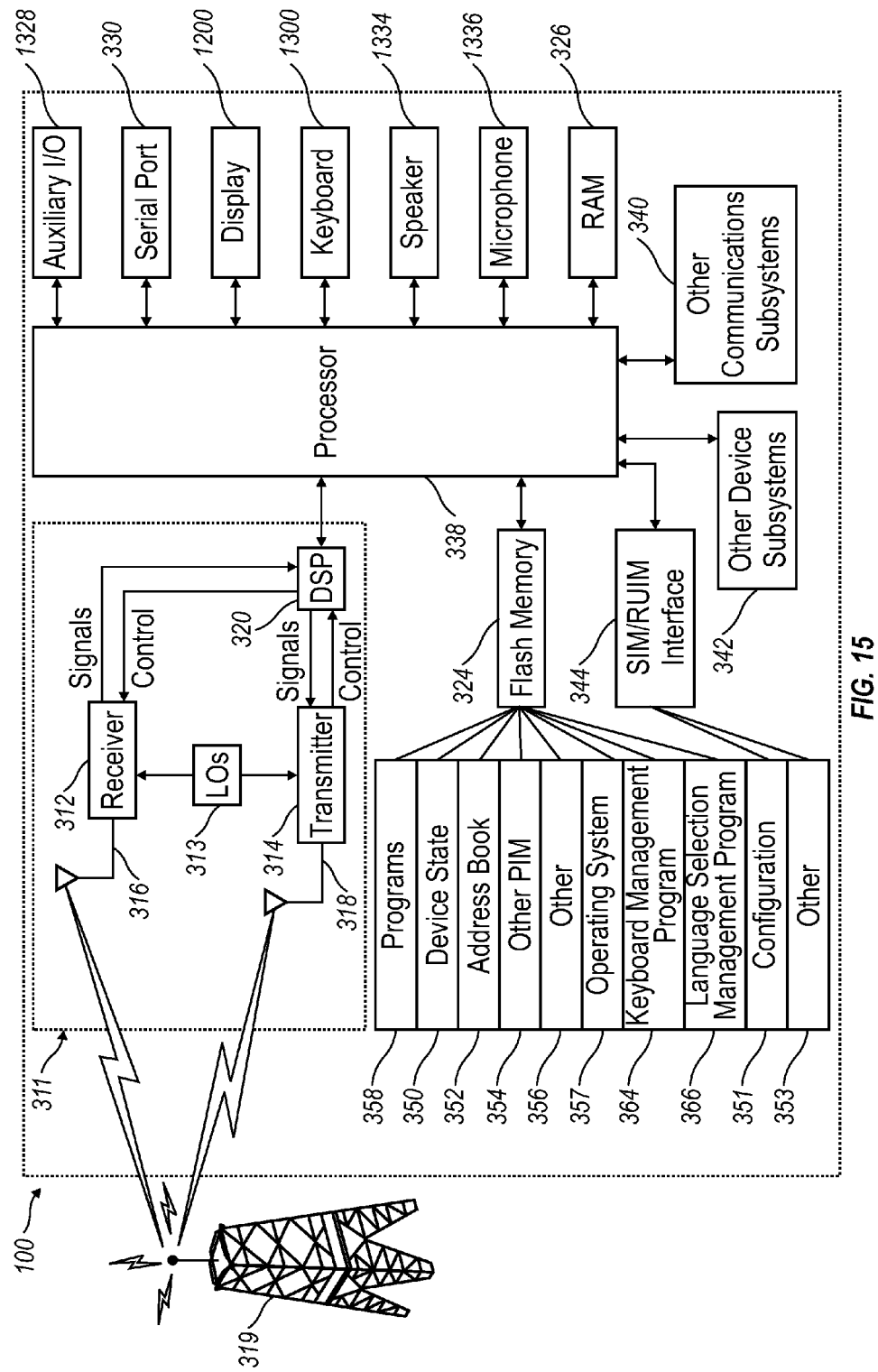
FIG. 15 is a block diagram representing a mobile device having a flip-around keyboard in accordance with an exemplary embodiment interacting with a communication network.

As shown in the block diagram of FIG. 15, the mobile device 100 includes a processing module 338 that controls the operation of the mobile device 100. In FIG. 15, the processing module 338 is a microprocessor. A communication subsystem 311 performs all communication transmission and reception with the wireless network 319. The microprocessor 338 further can be connected with an auxiliary input/output (I/O) subsystem 328 which can be connected to the communication device 100. In at least one embodiment, the microprocessor 338 can be connected to a serial port (for example, a Universal Serial Bus port) 330 which can allow for communication with other devices or systems. A display 1200 can be connected to the microprocessor 338 to allow for displaying of information to a user of the mobile device 100. When the mobile device 100 is equipped with a keyboard 1300, the keyboard 1300 can also be connected with the microprocessor 338. In the presently described embodiment, a keyboard controller is in communication with the microprocessor 338 in order to send or relay messages corresponding to key pressings of the keyboard 1300 to the microprocessor 338. The communication device 300 can include a speaker 1334, a microphone 1336, random access memory (RAM) 326, and flash memory 324, all of which can be connected to the microprocessor 338. Other similar components can be provided on the mobile device 100 as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11 set of protocols) and associated circuits and components. The microprocessor 338 is able to perform operating system functions and enables execution of programs on the mobile device 100. In some embodiments not all of the above components can be included in the mobile device 100.

The auxiliary I/O subsystem 1328 can take the form of a trackwheel 1328 as illustrated in the embodiment shown in FIG. 4, directional keys, optical trackpad, touchpad, navigation keys, a touch-sensitive interface, or other I/O interface. These input keys 1800 can be located on the side surface 1125 of the mobile device 100 or can be located on any exterior surface of the mobile device 100. Other auxiliary I/O subsystems can include external display devices and externally connected keyboards (not shown). While the above examples have been provided in relation to the auxiliary I/O subsystem 1328, other subsystems capable of providing input or receiving output from the mobile device 100 are considered within the scope of this disclosure. Other keys can be placed along the side surface 1125 of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 15. In an exemplary embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, users can typically interact directly with the operating system 357 through a user interface which can include the keyboard 1300 and display 1200. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device program 358 or parts thereof can be loaded in RAM 326 or other volatile memory.

In one exemplary embodiment, the flash memory 324 contains programs 358 for execution on the mobile device 100 including an address book 352, a personal information manager (PIM) 354, and the device state 350. Furthermore, programs 358 and other information 356 including data can be segregated upon storage in the flash memory 324 of the mobile device 100.

When the mobile device 100 is enabled for two-way communication within the wireless communication network 319, it can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the mobile device 100 can require a unique identifier to enable the mobile device 100 to transmit and receive messages from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different communication devices 100. the mobile device 100 can be able to operate some features without a SIM/RUIM card, but it will not be able to communicate with the network 319. A SIM/RUIM interface 344 located within the mobile device 100 allows for removal or insertion of a SIM/RUIM card (not shown). The SIM/RUIM card features memory and holds key configurations 351, and other information 353 such as identification and subscriber related information. With a properly enabled mobile device 100, two-way communication between the mobile device 100 and communication network 319 is possible.

If the mobile device 100 is enabled as described above or the communication network 319 does not require such enablement, the two-way communication enabled mobile device 100 is able to both transmit and receive information from the communication network 319. The transfer of communication can be from the mobile device 100 or to the mobile device 100. In order to communicate with the communication network 319, the mobile device 100 in the presently described exemplary embodiment is equipped with an integral or internal antenna 318 for transmitting messages to the communication network 319. Likewise, the mobile device 100 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another exemplary embodiment are externally mounted on the mobile device 100.

When equipped for two-way communication, the mobile device 100 features a communication subsystem 311. As is understood in the art, this communication subsystem 311 is modified so that it can support the operational needs of the mobile device 100. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the mobile device 100 with the wireless network 319 can be any type of communication that both the wireless network 319 and mobile device 100 are enabled to transmit, receive and process. In general, these can be classified as voice and data. Voice communication generally refers to communication in which messages for audible sounds are transmitted by the mobile device 100 through the communication network 319. Data generally refers to all other types of communication that the mobile device 100 is capable of performing within the constraints of the wireless network 319.

Example device programs that can depend on such data include email, contacts and calendars. For each such program, synchronization with home-based versions of the programs can be desirable for either or both of their long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in a network 319 in which voice, text messaging, and other data transfer are accommodated.

With the mobile device 100 having a flip-around keyboard, the user of the mobile device 100 can use the touch screen display 1200 and the full keyboard 1300 in one hand without having to rotate the mobile device 100 into a landscape orientation. For example, in some conventional mobile devices, the device operates in a voice communication mode in a portrait orientation and must then be rotated into a landscape orientation in order to use a full keyboard for a text entry mode or a messaging mode. The present mobile device 100 having a flip-around keyboard 1300 eliminates the need to change the orientation of the device when operating in a voice communication mode or a text entry or messaging mode while also providing the user with the full keyboard 1300. The flip-around keyboard 1300 also permits the use of a full keyboard with the touch screen display 1200. The flip-around keyboard 1300 also allows for a less obstructed display 1200 when the keyboard 1300 is not in use. Additionally, when the keyboard 1300 is not in use (the second configuration 2000) and when the keyboard 1300 is in use (the first configuration 1000), the mobile device 100 will not be any larger in either width or length because the width 1600 and length 1500 are the same in both the first configuration 1000 and the second configuration 2000. In other words, the width and length of the mobile device 100 having a flip-around keyboard 1300 does not change when the device is used in a voice communication mode, a multimedia mode, an internet mode, a word processing mode, or a messaging mode. Additionally, because the keyboard 1300 is a physical keyboard 1300 and need not be incorporated with a touch screen display, the user can experience tactile feedback when entering input into the keyboard 1300.

Exemplary embodiments have been described hereinabove regarding a mobile device 100 having a flip-around keyboard 1300. However, one of ordinary skill in the art will appreciate that the flip-around keyboard 1300 can be implemented on other devices, such as handheld computing devices, PDAs, cellphones, or other mobile devices utilizing keyboard, keypads, or switch panels to input data to the mobile device. One of ordinary skill in the art will also appreciate that the input entered at the keyboard 1300 can be performed by devices other than a processor, such as a hardware component, a hardware driver, an API, or other similar devices and components. Various modifications to and departures from the disclosed embodiments will occur to those having skill in the art. The subject matter that is intended to be within the spirit of this disclosure is set forth in the following claims.

What is claimed is:

1. A mobile device comprising:
   a housing having a top end, a bottom end, a front surface, and a back surface;
   a display on the front surface of the housing; and
   a keyboard rotatably coupled to the housing at about the bottom end of the housing, the keyboard comprising a front face having a plurality of keys and a rear face opposite the front face;

said keyboard having a first configuration in which the rear face of the keyboard faces the display, and a second configuration in which the front face of the keyboard faces the back surface of the housing.

2. The mobile device of claim 1, wherein the keyboard is rotatably coupled to the housing to permit greater than two hundred seventy degrees of rotation about a lateral axis parallel to an edge of the housing.

3. The mobile device of claim 2, wherein the edge of the housing is at the bottom end of the housing.

4. The mobile device of claim 1, wherein the mobile device has a length and a width, and the length and the width are substantially the same when the keyboard is in the first configuration and the second configuration.

5. The mobile device of claim 1, wherein the keyboard is a capacitive keyboard.

6. The mobile device of claim 1 further comprising a hinge that rotatably couples the keyboard to the housing.

7. The mobile device of claim 6, wherein the hinge is a double-pinned hinge.

8. The mobile device of claim 1, wherein the display is a touch screen display.

9. The mobile device of claim 1 further comprising a keyboard receiving portion on the back surface of the housing, said keyboard receiving portion configured to matingly engage the keyboard such that the rear face of the keyboard is contiguous with the back surface of the housing.

10. The mobile device of claim 1 further comprising a lock that temporarily locks the keyboard in the first configuration.

11. The mobile device of claim 1, wherein at least some of the keys of the keyboard have translucent indicia thereon, said translucent indicia being illuminated by the display when the keyboard is in the second configuration.

12. The mobile device of claim 1 further comprising a processing module communicatively coupled to the display and the keyboard, said processing module programmed to adjust an intensity of light emitted by the display based on the keyboard being in the first configuration or the second configuration.

13. The mobile device of claim 12, wherein when the keyboard is in the first configuration, the processing module is further programmed to adjust the intensity of light beneath the portion of the display covered by the keyboard to an intensity greater than the remainder of the display.

14. A rotatable keyboard comprising:
a front face having a plurality of keys;
a rear face opposite the front face; and
a coupler that rotatably couples the keyboard to a mobile device housing and permits more than two hundred seventy degrees of rotation about a lateral axis that is parallel to an edge of the housing;
said keyboard having a first configuration in which the rear face of the keyboard faces a display of the housing, and a second configuration in which the front face of the keyboard faces a back surface of the housing.

15. The rotatable keyboard of claim 14, wherein the mobile device has a length and a width, and the length and the width are substantially the same when the keyboard is in the first configuration and the second configuration.

16. The rotatable keyboard of claim 14, wherein the coupler is a double pinned hinge.

17. A mobile communication device comprising:
a housing having a top end, a bottom end, a front surface, and a back surface;
a touch sensitive display on the front surface;
a keyboard rotatably coupled to the housing at about the bottom end of the housing, the keyboard comprising a front face having a plurality of keys and a rear face opposite the front face;
said keyboard having a first configuration in which the rear face of the keyboard faces the display, and a second configuration in which the front face of the keyboard faces the back surface of the housing.

18. The mobile communication device of claim 17, wherein the keyboard is rotatably coupled to the housing to permit greater than two hundred seventy degrees of rotation about a lateral axis parallel to an edge of the housing.

19. The mobile communication device of claim 17, wherein the mobile device has a length and a width, and the length and the width are substantially the same when the keyboard is in the first configuration and the second configuration.

20. The mobile communication device of claim 1 further comprising a navigation tool.

* * * * *